United States Patent [19]

Margiloff

[11] 4,038,935
[45] Aug. 2, 1977

[54] TRAFFIC SIGNALING ATTACHMENT DEVICE FOR BICYCLES

[76] Inventor: Henry Margiloff, 1817 S. Ocean Drive, West Bldg. P.H. 28, Hallandale, Fla. 33009

[21] Appl. No.: 733,927

[22] Filed: Oct. 19, 1976

[30] Foreign Application Priority Data

Dec. 23, 1975 United Kingdom ............ 52588/75

[51] Int. Cl.² ............... B60Q 1/34; B62J 5/00
[52] U.S. Cl. .................. 116/35 R; 116/52; 280/289 R
[58] Field of Search ............ 116/46–47, 116/51, 52, 35 R, 35 A, 28 R; 280/289 R

[56] References Cited

U.S. PATENT DOCUMENTS

| 1,347,334 | 7/1920 | Johnson | 116/53 |
| 1,403,381 | 1/1922 | Brettell | 116/46 |
| 1,635,427 | 7/1927 | McEntee | 116/35 A |
| 2,540,394 | 2/1951 | Hallingsworth | 116/52 |
| 3,788,268 | 1/1974 | Hiatt et al. | 116/28 R |
| 3,812,815 | 5/1974 | Kuenzel | 116/28 R |
| 3,967,575 | 7/1976 | Coutts | 116/35 A |
| 3,982,771 | 9/1976 | Tropeano | 116/35 R |

FOREIGN PATENT DOCUMENTS

| 1,002,227 | 3/1952 | France | 280/289 R |
| 445,696 | 2/1949 | Italy | 280/289 R |

Primary Examiner—Richard C. Queisser
Assistant Examiner—Daniel M. Yasich
Attorney, Agent, or Firm—Ernest H. Schmidt

[57] ABSTRACT

A traffic signaling attachment device for bicycles has a supporting framework securable at one end to the bicycle post clamp, pivotally journaled along which framework is a control rod having a manually actuable handle at the front end just forward of the seat, and a perpendicularly outwardly-extending signal arm at the other end adapted for left or right turn signaling, or caution signaling, upon rotary manipulation of the handle.

9 Claims, 6 Drawing Figures

TRAFFIC SIGNALING ATTACHMENT DEVICE FOR BICYCLES

This invention relates to bicycling, and is directed particularly to a traffic signaling attachment device for mechanically signaling both oncoming traffic and traffic approaching from behind that the rider wishes to make a left or right-hand turn or, alternatively, to caution traffic of any condition that the rider may consider to be hazardous.

The principal object of this invention is to provide a novel and improved signaling attachment device for bicycles including a signal arm member prominently visible to both oncoming traffic and traffic approaching from behind, and which can readily be actuated by the bicycle rider from its normal upwardly-projecting position either to the left or to the right, or rapidly between left and right positions in a waving-like motion, for left-hand, right-hand and caution signaling, selectively.

A more particular object of the invention is to provide a traffic signaling attachment device for bicycles which can readily be assembled to an ordinary bicycle simply by the attachment of one end of the supporting framework thereof to the usual bicycle seat post clamp, and wherein signaling actuation of the control arm is readily accomplished by handle means at a position just forward of and somewhat below the bicycle seat. An auxiliary handle is provided just just behind the seat for alternative use by skirt wearing female riders.

Another object of the invention is to provide a traffic signaling attachment device of the character described wherein the signaling arm, although of substantial length for good visability with respect to both oncoming and following traffic, is at the same time readily bendable and self-erecting so as not to interfere with mounting and demounting of the bicycle in the usual fashion of swinging the leg over the seat.

Yet another object of the invention is to provide a traffic signaling attachment device of the above nature wherein both the forwardly-projecting actuating handle and the signal arm are fabricated of readily yieldable and comparatively soft materials so as to minimize any possibility of bodily harm.

Still another object of the invention is to provide a traffic signaling attachment device for bicycles which will be simple in construction, economical to manufacture, easy to attach to and remove from a bicycle, and effective and durable in use.

Other objects, features and advantages of the invention will be apparent from the following description when read with reference to the accompanying drawings. In the drawings, wherein like reference numerals denote corresponding parts throughout the several views.

Figure 1:
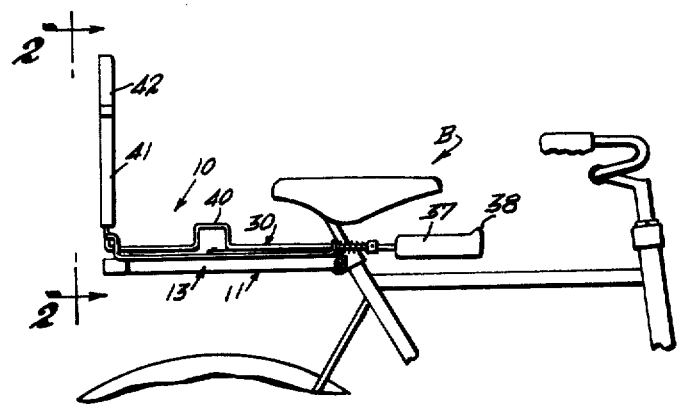
FIG. 1 is a side elevational view of a traffic signaling attachment device for bicycles embodying the invention, shown assembled to a bicycle.
Figure 3:
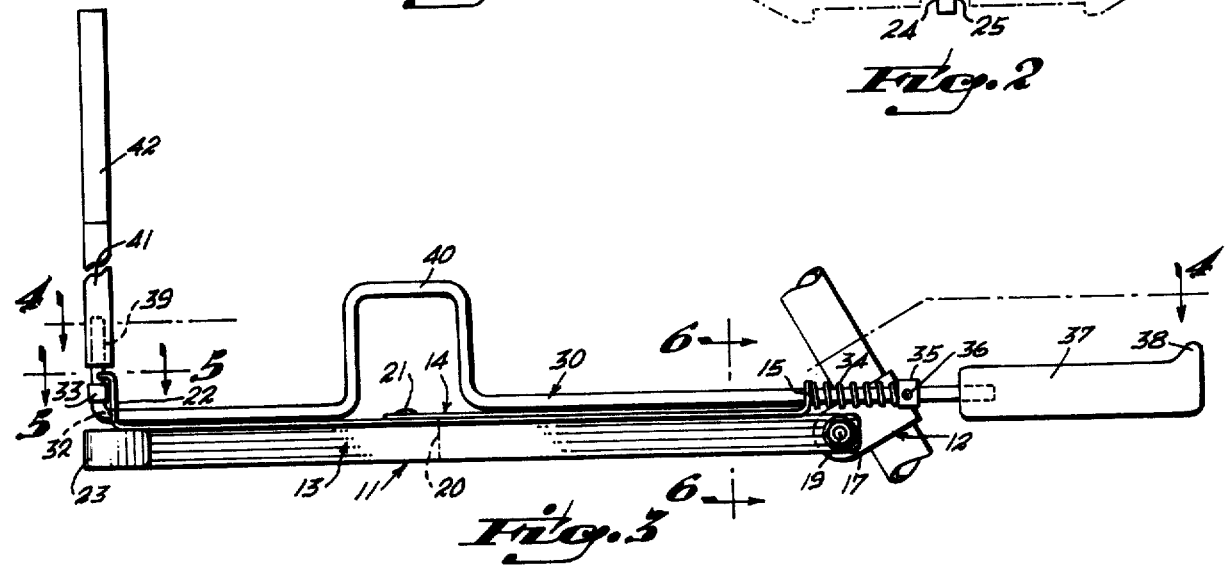
FIG. 3 is an elevational view similar to that of FIG. 1, but showing details of the signaling attachment device on an enlarged scale.
Figure 4:
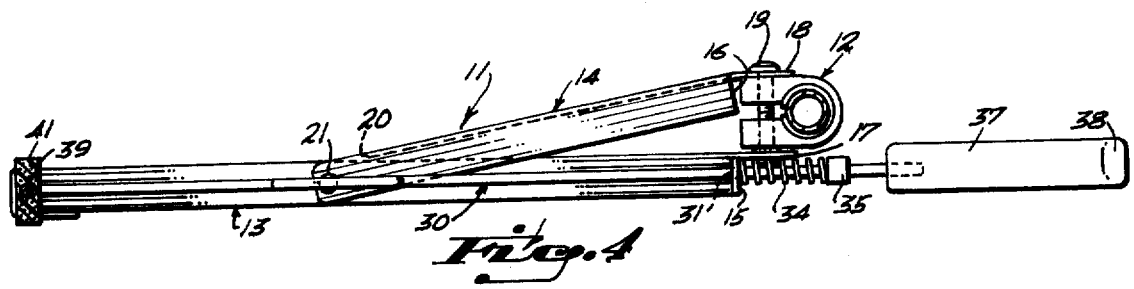
FIG. 4 is a longitudinal cross-sectional view taken along the line of 4—4 of FIG. 3 in the direction of the arrows.

Referring now in detail to the drawings, reference numeral 10 designates, generally, a traffic signal attachment device embodying the invention shown assembled to a bicycle B, (partially illustrated in FIG. 1). As best illustrated in FIGS. 3 and 4, the signaling attachment device 10 comprises a supporting framework 11 attachable at its forward end to the seat support clamp 12 of a typical bicycle, as is hereinafter more particularly described.

The supporting framework 11 will preferably be fabricated of lengths of extruded aluminum of right angular cross-section to provide a main framework member 13 and a bracing framework member 14. The main framework member 13, at the forward end thereof, has a horizontal webb portion cut away and bent upwardly, as indicated at 15, for the purpose hereinafter appearing. The forward end of the bracing member 14 has a horizontal webb portion cut away to provide a recess, as indicated at 16. The projecting vertical webb portions 17 and 18 of the respective main and bracing framework members 13, 14 lie in mutually parallel planes, and are transversely drilled to receive therethrough the securing bolt 19 of the bicycle seat support clamp 12 upon attachment of the device to a bicycle, as is hereinafter more particularly described. The rearward end of the bracing framework member 14 has a rearward portion of its vertical webb cut away, as indicated at 20, to provide for overlap of the separated horizontal webb portion thereof upon an upper horizontal surface portion of the main framework member 13, to which it is pivotally attached as by rivet 21.

Figure 5:
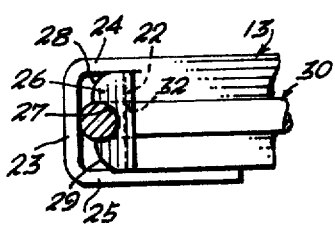
FIG. 5 is a fragmentary horizontal cross-sectional view taken along the line 5—5 of FIG. 3 in the direction of the arrow on an enlarged scale.

The rearward end of the main framework member 13 has its upper or horizontal webb portion separated from and bent upwardly with respect to its vertical webb portion, as indicated at 22, and the separated vertical webb portion is reversely bent to extend somewhat beyond said vertically upwardly-bent portion at each side thereof, as indicated at 23, to provide opposing abuttment edge portions 24 and 25, for the purpose hereinafter appearing, (see FIGS. 3 and 5). As is also best illustrated in FIG. 5, the upper end of the vertically upwardly-bent portion 22 terminates in a right-angular, rearwardly-directed cam portion 26 having a central recess 27 and rounded, opposed outer corners 28 and 29.

A longitudinal control rod 30 extends through and is journaled in openings 31 and 32 provided in respective turned-up portions 15 and 22 of the main framework member 13. As best illustrated in FIG. 3, the rear opening 32 is so located as to be substantially tangential with respect to the upper surface of the horizontal webb of the main framework member 13. The control rod 30 is bent at right angles immediately beyond its passage through the rear opening 32, and is preferably fitted thereat with a short abutment sleeve 33 which normally abuts the outer surface of the rearward upwardly-bent portion 22.

The forward end of the control rod 30 extends somewhat beyond the turned-up portion 15 in which it is journaled, and is yieldingly urged in the forward direction with respect to the supporting framework 11 by means of a circumjacent helical spring 34 abuttingly constrained between an outer surface portion of said turned-up portion and a collar 35 adjustably secured along said control rod as by set-screw 36. Secured to the forward end of the control rod 30 is a flexible control handle 37 having, preferably at its outer end, a radially outwardly-extending projection 38 indicative of the radially outwardly-extending direction of the right-angularly bent portion 39 at the rearward end of said control rod, for the purpose hereinafter appearing. In this connection it is to be noted that the control handle 37 extends well beyond the inner end of the control rod 30 to which it is secured, and is flexible enough to give or bend readily if inadvertantly pushed against by body portions of the bicycle rider, so as to minimize any possibility of injury.

As illustrated in FIGS. 1, 3 and 4, the control rod 30 is formed with a reversely bent, normally upwardly-extending, auxiliary handle portion 40 for alternative use in controlling the signaling attachment device, particularly by female riders wearing skirts, which would ordinarily prevent use of the forward control handle 37.

As illustrated in FIGS. 1, 3, 4 and 5, the helical compression spring 34 serves normally to urge the control rod 30 in the forward direction so that the right-angularly bent portion 39 at the rearward end thereof is seated in the recess 27, whereat said right-angularly bent portion extends vertically upwardly. Secured to the right-angularly bent portion 39 is a semi-rigid signal arm member 41, which may be fabricated of a foamed synthetic plastic material, for example, and which preferably terminates in an arrowhead 42.

The signal arm member 41 serves as the traffic signaling device, and will preferably be of a bright color such as red or orange for enhanded visibility. For night riding it is contemplated that the signal arm member 41 be coated with a light-reflective material, or even made luminous by a self-contained electrical lighting system energized by dry cells.

Figure 6:
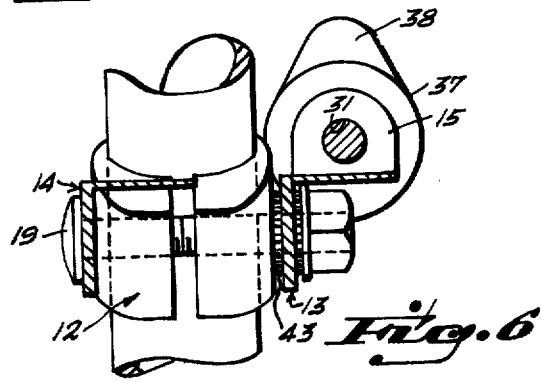
FIG. 6 is a vertical cross-sectional view taken along the line 6—6 of FIG. 3 in the direction of the arrow and illustrating mechanical details of the means for attaching the signaling device to the seat clamp of a bicycle.

As best illustrated in FIGS. 3, 4 and 6, the traffic signaling attachment device is applied to a bicycle simply by removing the usual securing bolt 19 of the bicycle seat support clamp 12 to permit the apertured webb portions 17 and 18 of the respective main and bracing framework members 13 and 14 to be clamped in place against each side of said seat support clamp upon reassembly of the securing bolt. As illustrated in FIG. 6, an additional lock washer 43, preferably a spider lock washer, will be applied between the inside of the main framework member webb portion 17 and the bicycle seat support clamp 12 for enhanced positional securement. In this connection it will be noted that the supporting framework 11 can be adjusted, upon its securement, both vertically about its pivotal connection by means of the clamp bolt, and horizontally by slight rotative adjustment of the seat support clamp 12. Such limited universal adjustment of the signaling attachment device provides for best positioning of the control handle 37 under the bicycle seat so that it can conveniently be manually controlled by the bicycle rider without interference with portions of the bicycle framework or seat.

Figure 2:
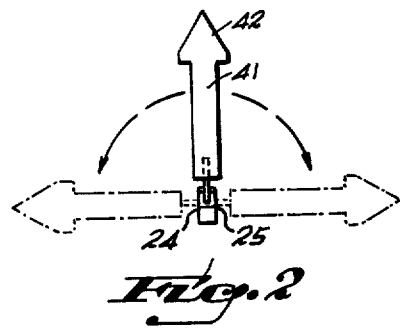
FIG. 2 is a rear elevational view taken along the plane indicated at 2—2 of FIG. 1 in the direction of the arrows and illustrating operation of the signaling arm.

In use of the attachment device for signalling, the rider will grasp either the main control handle 37 or the auxiliary handle portion 40 of the control rod and push rearward slightly to disengage the right-angularly bent portion 39 of said control rod from the cam recess 27, thereby permitting rotary movement as indicated in FIG. 2 for signaling either a left-hand or right-hand turn. By pushing rearwardly on the control rod and rotating it rapidly first in one direction and then in the other direction, as in a waving motion, the rider is able to signal "caution" or give warning of a potentially hazardous traffic condition, thereby inducing both oncoming and rearwardly approaching traffic to reduce speed and to be particularly alert.

It will be understood of course, as illustrated by the broken-line representations thereof in FIG. 2, that in signaling left or right-hand turns, the signal arm member 41 will be allowed to rest in its selected horizontal outwardly-extending position until the indicated turn has been completed. In this connection it is further to be understood that the right-angularly bent portion 39 at the rearward end of the control rod 30 rests against abutment edge portion 24 in the case of a left turn, and abutment edge portion 25 in the case of a right turn, (see also FIG. 5).

While I have illustrated and described herein only one form in which my invention can conveniently be embodied, it is to be understood that this form is presented by way of example only and not in a limiting sense. My invention, in brief, comprises all the modifications and embodiments coming within the scope and spirit of the following claims.

What I claim as new and desire to secure by Letters Patent is:

1. A traffic signaling attachment device for bicycles or the like comprising, in combination, an elongated supporting framework, means for attaching said supporting framework to a bicycle so as to extend rearwardly of the bicycle seat above the rear bicycle wheel, an elongated control rod journaled along the length of said supporting framework, an elongated signal arm member fixed with respect to an extending substantially perpendicularly outwardly of said control rod, means yieldingly constraining said control rod so that said signal arm member normally extended in a vertically upward direction, and resilient handle means connected to the control rod for turning said control rod about its longitudinal axis for moving said signal arm member, selectively, to and between opposed, sidewardly outwardly-extending positions for signaling traffic, said signal arm member being of a resilient and collapsible material, thereby enabling its bending to minimize obstruction to the bicycle rider upon his mounting and demounting the bicycle.

2. A traffic signaling attachment device for bicycles or the like as defined in claim 1, said handle means comprising a first control handle extending axially outwardly of the forward end of said control rod, and said signal arm member being fabricated of a foamed synthetic plastic material.

3. A traffic signaling attachment device for bicycles or the like as defined in claim 2 and further including an auxiliary handle member intermediate the ends of said control rod for manipulation from behind the seat of a bicycle to which the signaling attachment device is applied.

4. A traffic signaling attachment device for bicycles or the like as defined in claim 1 wherein said means yieldingly constraining said control rod comprises a helical compression spring circumjacent said control rod and constrained between a forward end portion of said framework means and collar means secured to a forwardly projecting portion of said control rod, and cam means formed at the rearward end of said framework means, the rearward end of said control rod terminating in a perpendicularly outwardly-extending portion cooperative with said cam means and serving as a detent normally retaining said perpendicularly outwardly-extending control rod portion in the vertically upwardly-extending direction upon said signaling attachment device being applied to a bicycle.

5. A traffic signaling attachment device for bicycles or the like as defined in claim 4 wherein said signal arm member is fixed with respect to and extends coaxially outwardly of said perpendicularly outwardly-extending terminal end portion of said control rod.

6. A traffic signaling attachment device for bicycles or the like as defined in claim 1 wherein said elongated supporting framework comprises a main elongated framework member and a comparatively short bracing framework member, said bracing framework member having one end pivotally secured at a position intermediate the ends of said main framework member and projecting forwardly substantially coextensive with the forward projection of said main framework member.

7. A traffic signaling attachment device for bicycles or the like as defined in claim 6 wherein said supporting framework attachment means comprises transversely aligned through openings in forward end portions of said main and bracing framework members to provide for the passage therethrough of the bicycle seat support clamp bolt for attaching said forward end portions of said framework members in clamping engagement with respect to the seat support clamp.

8. A traffic signaling attachment device for bicycles or the like as defined in claim 7 wherein said main and bracing framework members are each fabricated of lengths of extruded metal having a right angular cross section.

9. A traffic signaling attachment device for bicycles or the like as defined in claim 8 wherein said handle means comprises a first control handle extending axially outwardly of the forward end of said control rod and an auxiliary handle member intermediate the ends of said control rod for manipulation from behind the seat of a bicycle to which the signaling attachment device is applied, said first control handle being of a resilient material.

* * * * *